Figure 1:
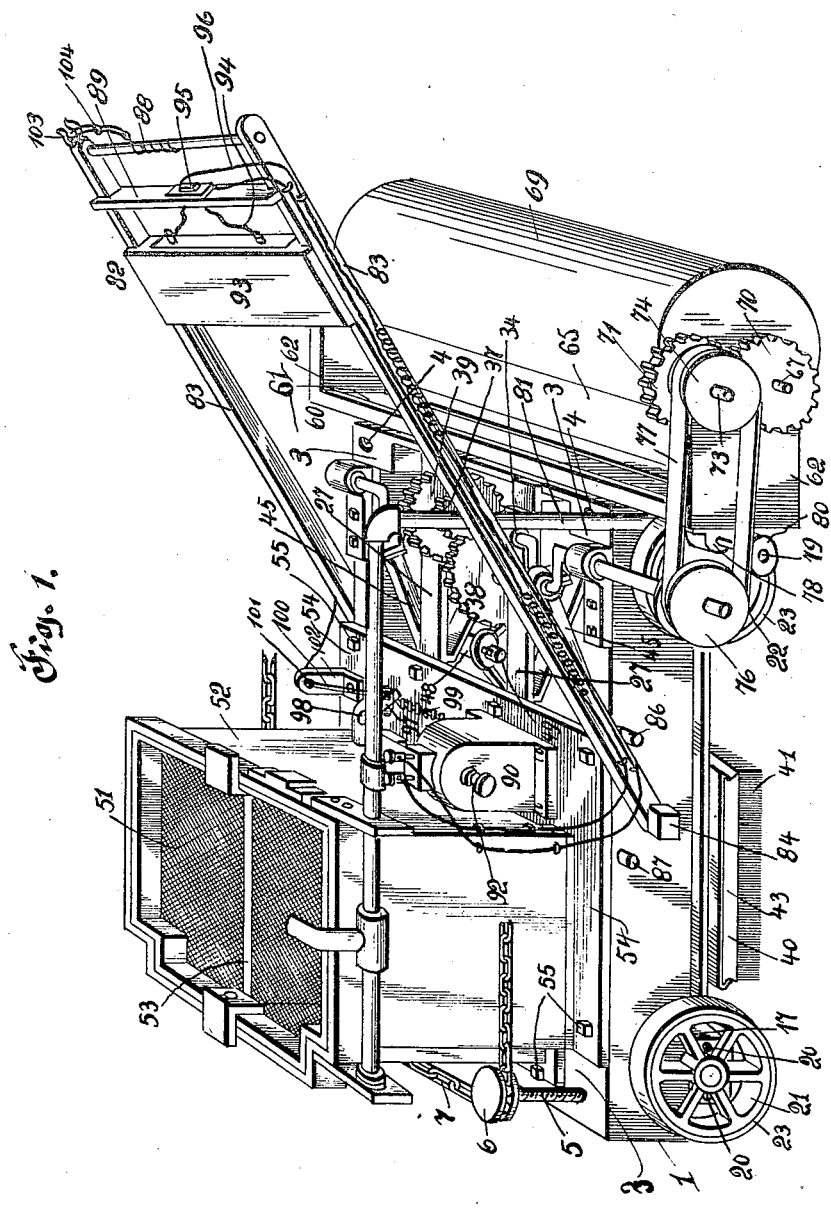

No. 870,454. PATENTED NOV. 5, 1907.
T. McCABE & J. J. RAUCH.
SCRUBBING MACHINE.
APPLICATION FILED JULY 3, 1905.

5 SHEETS—SHEET 1.

Witnesses:
C. Klostermann
K.N. Butler

Inventors.
Thomas McCabe; John J. Rauch
by N.C. Evert & Co.
Attorneys.

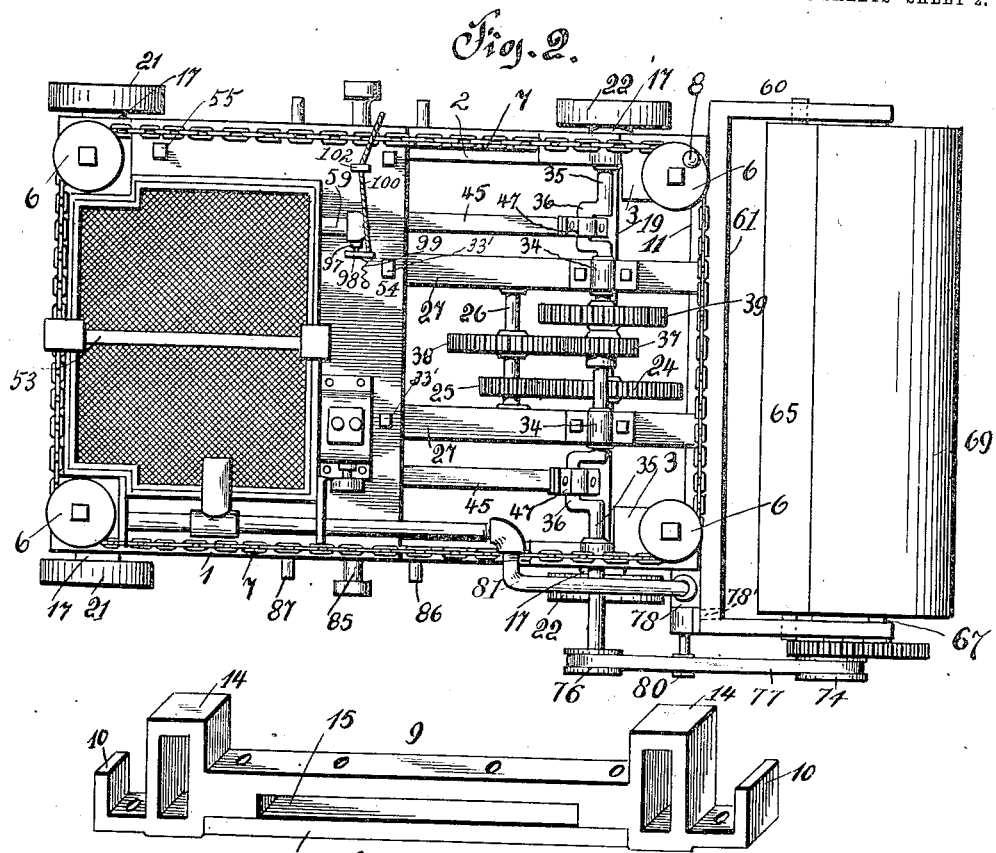

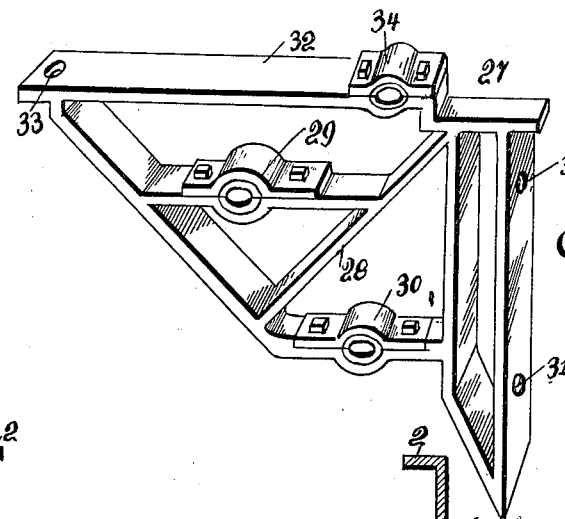
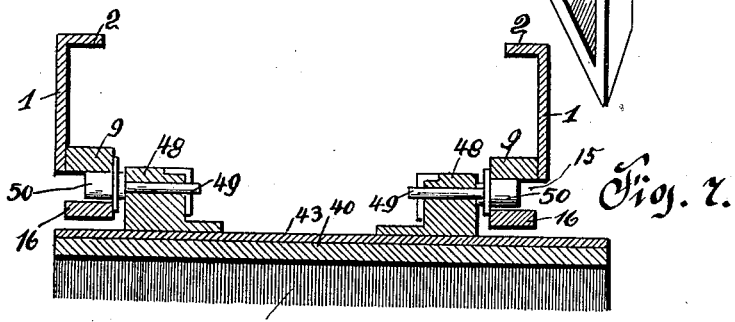
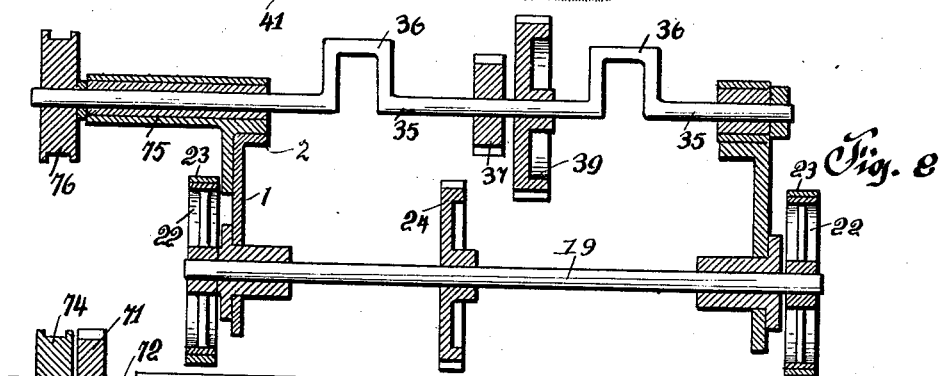
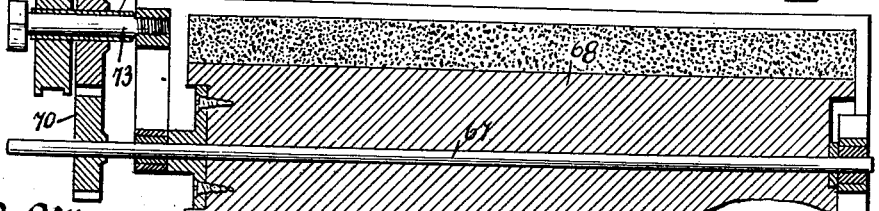

No. 870,454. PATENTED NOV. 5, 1907.
T. McCABE & J. J. RAUCH.
SCRUBBING MACHINE.
APPLICATION FILED JULY 3, 1905.
5 SHEETS—SHEET 4.
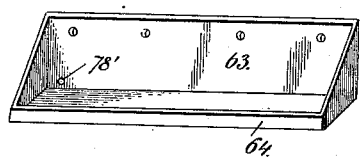
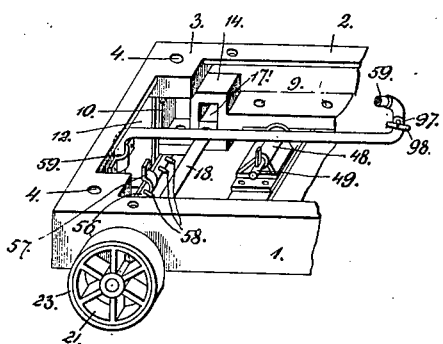
WITNESSES:
A. H. Rabsay.
K. H. Butler
INVENTORS:
Thomas McCabe & John J. Rauch
BY H. C. Everitt & Co.
Attorneys No. 870,454. PATENTED NOV. 5, 1907.
T. McCABE & J. J. RAUCH.
SCRUBBING MACHINE.
APPLICATION FILED JULY 3, 1905.

5 SHEETS—SHEET 5.

Witnesses:
Jesse E. Miller.

Inventors.
Thomas McCabe; John J. Rauch
by N. C. Everett Co.
Attorneys.

UNITED STATES PATENT OFFICE.

THOMAS McCABE, OF HOMESTEAD, AND JOHN J. RAUCH, OF MUNHALL, PENNSYLVANIA.

SCRUBBING-MACHINE.

No. 870,454.      Specification of Letters Patent.      Patented Nov. 5, 1907.

Application filed July 3, 1905. Serial No. 268,132.

*To all whom it may concern:*

Be it known that we, THOMAS McCABE and JOHN J. RAUCH, citizens of the United States of America, residing, respectively, at Homestead and Munhall, in the county of Allegheny and State of Pennsylvania, have invented certain new and useful Improvements in Scrubbing-Machines, of which the following is a specification, reference being had therein to the accompanying drawing.

This invention relates to certain new and useful improvements in scrubbing machines, and the invention has for its object to provide a novel machine adapted to scrub and dry a surface, such as a floor.

To this end, I have devised a machine adapted to be manually operated and in connection with the machine, I have devised novel means for first sprinkling a surface with water, scrubbing the same with brushes and then removing the dirty water from the surface and drying the same.

With the above and other objects in view, the invention consists in the novel construction, combination and arrangement of parts which will be hereinafter more fully described and then specifically pointed out in the claims, and referring to the drawing accompanying this application, like numerals of reference designate corresponding parts throughout the several views, in which:—

Figure 14:
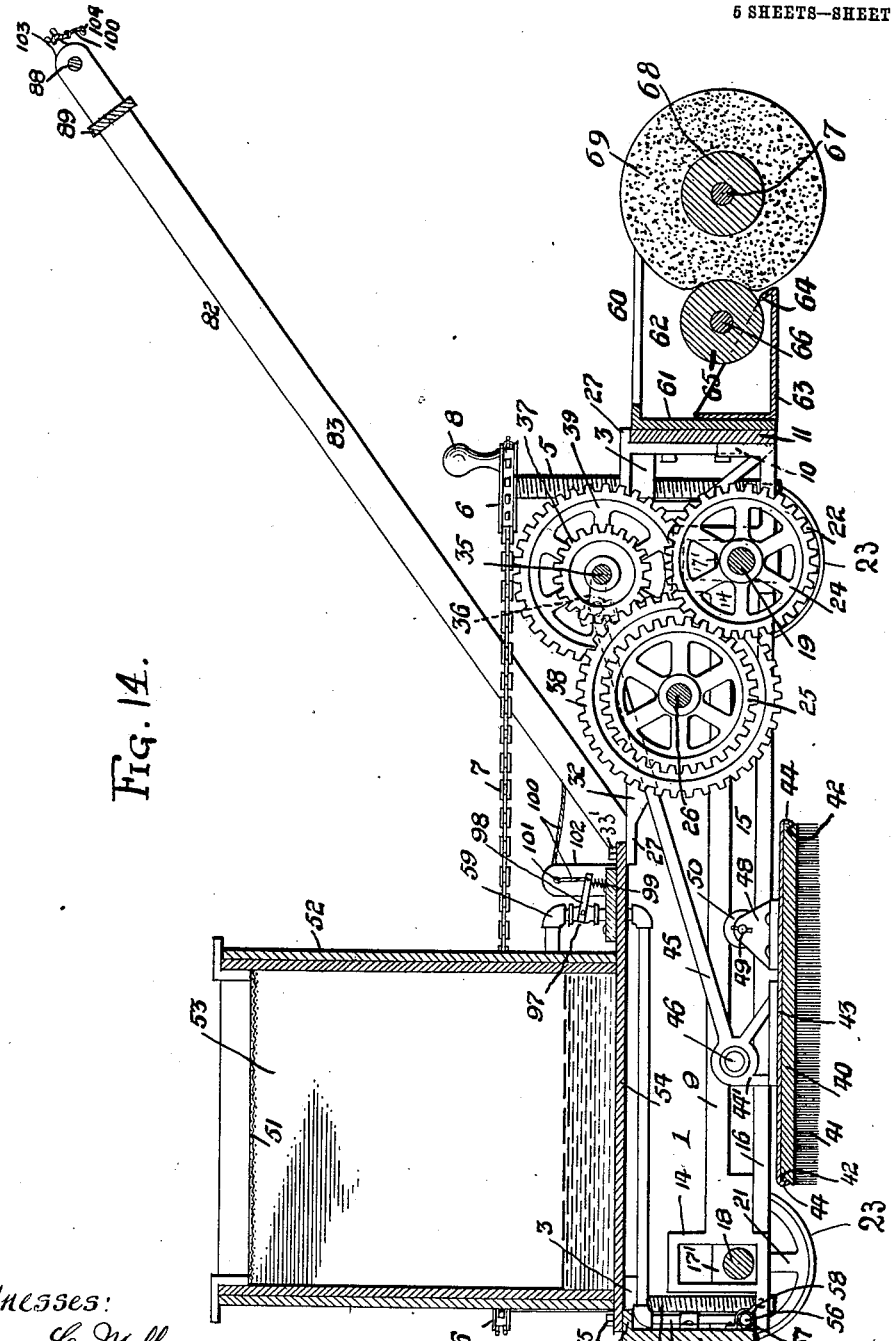

Figure 1 is a perspective view of my improved machine, Fig. 2 is a top plan view of the same, with the operating handle and its attachment removed, Fig. 3 is a perspective view of one of the slides used in the machine, Fig. 4 is a sectional view of one of the reciprocating brushes employed in the machine, and Fig. 5 is a side elevation of the same, partly in section, Fig. 6 is a perspective view enlarged of one of the brackets employed in the machine, Fig. 7 is a cross sectional view enlarged of the guides illustrating the relative position of a brush to said guides, Fig. 8 is a detail sectional view enlarged through a crank shaft and the rear axle of the machine, Fig. 9 is a vertical sectional view enlarged of the drier mechanism, Fig. 10 is a perspective view of the drier tank, Fig. 11 is a fragmentary perspective view of the front part of my improved machine, Fig. 12 is a cross sectional view enlarged of the drier mechanism, Fig. 13 is a horizontal sectional view of the drier rollers, Fig. 14 is a longitudinal sectional elevation of the improved device, Fig. 15 is a sectional detail illustrating the manner of arranging the frame and axle and the slide members.

To put my invention into practice, I construct my improved machine of a substantially rectangular frame 1 having its upper edges flanged inwardly, as indicated at 2. The upper corners of the frame are provided with blocks 3 having vertically disposed screw threaded apertures 4 formed therein. In these apertures are mounted screws 5, the upper ends of which carry sprocket wheels 6, and over these sprocket wheels passes an endless chain 7. One of the sprocket wheels is provided with a handle 8, whereby said wheel can be rotated to impart a similar movement to the wheels 6 and screws 5 through the medium of the chain 7.

The lower ends of the screws 5 are connected to slides 9, 9 arranged longitudinally of the frame upon each side thereof in any well known manner so as to turn in the slides while attached to the same. One of these slides is clearly illustrated in Fig. 3 of the drawings. Each slide is provided with upwardly extending ends 10 adapted to bear against the end walls 11 and 12 of the frame 1, and adjacent to each one of these ends, I provide vertically disposed housings 14, 14 which are formed integral with the slides. The underneath face of each guide between the housings 14, 14 is cut away to form a guide way 15, and a plate 16 is adapted to be secured to the lower face of each guide to inclose the guide way 15, thus providing a slot, the object of which will be presently described. In the housings 14, 14 are mounted journal bearings 17 in block like form and slidable vertically in the housings 14, and forming the bearings of a front axle 18 and the rear axle 19 of the machine. The axles are journaled in the sides of the frame 1 by bearings one of which is shown at 17 in Fig. 1, and the slides 9 are movable vertically upon the bearings 17' as guides. The outer ends of each of the axles 18 and 19 are provided with wheels 21, 21 and 22, 22, these wheels being preferably provided with rubber tires 23.

Upon the rear axle 19 of the machine, I mount a large gear wheel 24, which meshes with a small gear wheel 25 mounted upon a shaft 26 journaled in brackets 27, 27 carried by the frame 1 of the machine. One of these brackets is clearly illustrated in Fig. 6 of the drawing, and by referring to said figure it will be observed that the brackets are substantially triangular in form and that the ribs or braces 28 of the brackets are provided with journal boxes 29 and 30, the journal boxes 29 supporting the shaft 26. The vertical edge of each bracket is provided with apertures 31, 31 whereby the brackets can be secured to the rear wall 11 of the frame. The forward end of the horizontal portion 32 of each bracket is provided with an aperture 33, the object of which is to receive a bolt 33' by means of which the bracket is secured to the frame. The horizontal portion 32 of each bracket is provided with a journal box 34 and in these boxes is journaled a crank shaft 35 having two cranked portions 36, 36. Between the cranked portions 36, 36 of the shaft 35, I mount a gear wheel 37 adapted to mesh with a large gear wheel 38 mounted upon the shaft 26. In this manner a rotary motion is imparted to the crank shaft 35 from the rear axle 19, and I employ the crank shaft 35 for operating the reciprocating brush of my improved machine.

In Figs. 4, 5 and 7 of the drawings, I have illustrated the reciprocating brush, which consists of a block or plate 40 carrying a conventional form of depending bristles or wires 41, which are employed to scrub the surface over which the machine passes. The edges of the plate or block 40 are grooved as indicated at 42, 42, whereby the brush may be secured in a casing 43, the casing being provided with depending edges 44 to engage in the grooves 42, 42 of the plate or block 40. The casing 43 is provided with journal bearings 44' for pitman rods 45, 45, pins 46, 46 being employed to pivotally connect the pitman rods to the journal bearings 44'. The opposite ends of the pitman rods 45 are connected to the cranked portions 36, 36 of the shaft 35, as indicated at 47, 47. In order that the brush carried by the casing 43 may be reciprocated, I provide the casing 43 with brackets 48, 48 and in these brackets I mount pins 49, 49. Upon the outer end of said pins are journaled flanged rollers 50, 50 which are adapted to engage in the guide ways 15 of the guides 9, 9 and sustain the brush within the machine.

It will be observed from the construction just described, that when the machine is moved across a surface, a reciprocatory movement will be imparted to the scrubbing brush of the machine through the crank shaft 35 and the pitman rods 45. The scrubbing brush can be elevated or lowered by the screws 5 and the guides 9, 9, this adjustment being necessary on account of the brush wearing and owing to the fact that where dirt has hardened or caked upon a surface, it is often necessary that the brush engage the surface with considerable friction in order to remove the dirt.

In connection with my improved machine, I employ a reservoir adapted to contain water in order that the surface to be cleansed can be sprinkled. A reservoir 51 consisting of a substantially rectangular tank or casing 52 having a central vertically disposed partition 53 is mounted upon the forward end of the machine. This reservoir is supported upon a plate 54 secured by screw bolts 55 to the flanged edge 2 of the frame 1. Secured to the lower inner edge of the end wall 12 of the frame 1 is a transversely disposed pipe 56, said pipe being supported by brackets 57. The pipe is provided with nipples 58 and communicates with the reservoir 51 by a pipe 59. When the reservoir is filled with water, the water will descend by gravity into the pipe 56 and will be sprayed upon the surface or floor over which the machine passes. The partition 53 divides the reservoir 51 into two compartments and in one of these compartments, I preferably place clean water which is sprayed upon the surface or floor, while the adjacent compartment is adapted to receive the dirty water removed from the surface or floor by the drier, which will now be described.

Secured to the rear wall 11 of the machine is a frame 60 consisting of a front wall 61 and end walls 62, 62. The front wall 61 of the frame 60 supports a drier tank 63, the rear edge or side 64 of which is of a lesser height than the front side, in order to accommodate a roller 65, mounted upon a shaft 66 journaled in the frame 60 of the machine. In the frame 60 is also journaled a shaft 67 upon which is mounted a roller 68 carrying an absorbent material 69. The roller 68 is mounted in such a manner that the roller 65 will engage the absorbent material 69 and as this material contacts with said roller, the absorbent material will be compressed causing the water absorbed by the material 69 to be deposited in the tank 63. I desire to call attention to the journal bearings of the shafts 66 and 67. As it is often necessary that the scrubbing machine be moved into corners of compartments and along the edges of walls, it is necessary that no unnecessary projections or protuberances exist which would interfere with the movement of the machine. For this reason, it has been my aim to compactly construct the machine whereby it could be readily used in difficult places, and by referring to Figs. 9 and 13 of the drawings, it will be observed that the journal bearings are housed within the frame 60, thus obviating the projecting of these journal bearings outside of the frame 60, which bearings if projected outside the frame would unnecessarily widen the machine.

In order that the roller 68 may be revolved, I have extended one end of the shaft 67 and have provided the same with a gear wheel 70 adapted to mesh with a gear wheel 71 mounted upon a sleeve 72, which is journaled upon a stub shaft 73. Mounted upon the sleeve 72 is a pulley wheel 74. To impart a rotary motion to the pulley 74, the one end of the crank shaft 35 is extended through a bearing 75 carried by the rectangular frame 1, and the outer end of the crank shaft 35 is provided with a pulley wheel 76. A belt 77 passes over the pulleys 76 and 74 imparting a rotary movement to the roller 68 from the crank shaft.

In connection with the machine, I employ a conventional form of rotary pump 78 which is secured to the front side of the frame 60. The main operating shaft 79 of the pump is provided with a pulley 80 which engages the lower side of the belt 77. The pump 78 is provided with a discharge pipe 81 adapted to convey the contents of the pump to the reservoir 51. The pump 78 is in communication with the tank 63 by a pipe 78' shown in dotted lines in Fig. 2 and as the water is absorbed by the roller 68 and deposited within the tank, the pump 78 is adapted to convey it to one of the compartments of the reservoir 51, from where it can be removed after the compartment has been filled.

To move the machine, a handle 82 is employed. This handle consists of two bars 83, 83, pivotally connected to the sides of the frame 1, as indicated at 84, the sides of the frame being provided with stud bolts 85, 85 upon which the lower ends of the bars 83, 83 are mounted. The sides of the frame 1 are provided with studs 86, 86 and 87, 87. When the machine is being pushed forward the bars 83, 83 are adapted to rest upon the studs 86, 86 and when the machine is being pulled forward the bars are adapted to rest upon the studs 87, 87. The upper ends of the bars 83, 83 are connected together by a tie rod 88 and a brace 89.

If preferred an electric motor may be used to operate the device, such a motor being shown at 90 in Fig. 1. The motor may be connected with the gearing by any suitable means through the armature shaft 92. The motor may be energized from batteries within a casing 93 mounted between the bars 83 and connected, by the wires 94, with a controller 95 carried by the brace 89, which controller is connected with the motor by wires 96.

In order to control the outlet of the reservoir 51 through the nipples 58 of the pipe 56, I provide the pipe 59 with a regulating valve 97, the lever 98 of which is connected by a spring 99 to the plate 54, this spring serving to retain the valve in a closed position. The lever 98 of the valve is also connected by a cord or cable 100 to the upper end of the handle 82, said cord or cable passing through an opening 101 formed in a bracket 102 carried by the plate 54. The upper end of the handle 82 is provided with a spring clasp 103 and I preferably provide the upper end of the cord or cable 100 with a plurality of knots or loops 104 which are adapted to engage in the spring clasp 103 and prevent the cable or rope from becoming detached from the handle.

It is thought from the foregoing that the construction, operation and advantages of the herein described scrubbing machine will be apparent without further description.

What I claim and desire to secure by Letters Patent, is:—

In a device of the class described, a supporting frame, spaced bearing blocks mounted in said frame and extending inwardly from the sides thereof, axles mounted in said blocks and provided with carrier wheel, guide members having vertical guide ways near the ends and slidably mounted on said blocks and having longitudinal guide ways intermediate the ends and guide stops at the ends bearing against the end members of said frame, a brush casing, brackets carried by said brush casing, guide rolls carried by said brackets and operating in the longitudinal guide ways of said guide members, means carried by said frame for adjusting said members vertically, means carried by said frame for reciprocating said brush casing, and means whereby the rotary motion of one of said axles is communicated to said reciprocating means.

In testimony whereof we affix our signatures in the presence of two witnesses.

THOMAS McCABE.
JOHN J. RAUCH.

Witnesses:
HOWARD MADEIRA,
FRANK E. BALDWIN.